2,973,384
PROCESS FOR SYNTHESIZING ETHYLENE

Tateki Hayashi, Tokyo, and Shigeru Tsutsumi, Hirakata-shi, Osaka, Japan, assignors to Chiyoda Chemical & Engineering Construction Co., Ltd., Tokyo, Japan No Drawing. Filed July 29, 1957, Ser. No. 674,614

Claims priority, application Japan Aug. 4, 1956

3 Claims. (Cl. 260—449.6)

This invention relates to improvements in or relating to a process for synthesizing ethylene.

A process referred to as the "Fischer-Tropsch process" which comprises synthesizing petroleum from carbon monoxide and hydrogen has been well known. In connection with this, a number of studies have been made concerning the production of gaseous, saturated and/or unsaturated hydrocarbons, so-called gasol, together with petroleum. It is, however, practically impossible to find one example wherein a product which predominates in lower olefins, particularly ethylene, is synthesized from carbon monoxide and hydrogen. Of course, the production of a large proportion of propylene and butylene together with ethylene was disclosed, for example, in the U.S. patent specification No. 2,717,259 (Union Carbide & Carbon Corp.), wherein an iron catalyst which has been deactivated to some extent by the addition of halogen is used to yield $C_2$-$C_4$ fractions in quantities. The product thus formed consists of 10–25% methane, 25–45% $C_2$-$C_4$ olefins and 10–25% $C_2$-$C_4$ paraffins, and from this illustration it will be apparent that the quantity of olefins is relatively small.

The object of the present invention is to provide a novel, improved process for synthesizing ethylene from carbon monoxide and hydrogen.

According to this invention, when carbon monoxide is reacted with hydrogen at temperatures of 200°–450° C., particularly in the order of about 250° C., under pressures from the ordinary pressure to super-atmospheric pressures up to 40 atm., using as a catalyst of a member selected from the group consisting of alumina gel, silica gel, and mixtures thereof, to which may be added (or not) oxides, salts and/or other compounds of chrome, copper, nickel, cobalt, or the like, conversion of more than 90% of carbon monoxide into ethylene is obtained.

The reaction of producing ethylene from carbon monoxide and hydrogen may be expressed by the following equation:

$$2CO + 4H_2 = CH_2{:}CH_2 + 2H_2O$$

From this equation a molar ratio 1:2 of CO to $H_2$ is considered to be proper. It was found, however, that when this reaction is brought about under the condition specified as above and using the catalyst of the kind referred to above, it is difficult to produce ethylene in good yield under ordinary pressure unless a charging stock is used which has a higher molar ratio of carbon monoxide to hydrogen than the 2:1 ratio. For instance, a quartz tube of 1 m. in length and 2 cm. in inner diameter was packed with 10 gr. of alumina and a portion of the same (60 cm. in length) was heated externally by means of the electric furnace. When a gas of CO:$H_2$=3:1 was then caused to pass through the tube at a throughput of 100–150 l./h. the conversion took place at temperatures of 350°–450° C., yielding a gas containing 5.5% of ethylene at maximum. Meantime, with the treatment of a gas of CO:$H_2$=1:1 under the same conditions the ethylene yield amounted to 4.2% and a feed of CO:$H_2$=1:2 resulted in as low as 3.0%.

As the material for the construction of the reaction tube, we used copper, brass, aluminum, and porcelain and substantially similar results were obtained as in the case where the quartz tube was used, whereas an extremely small quantity of ethylene was produced in case of the iron tube.

In contrast with the above experiments effected under the ordinary pressure, it was found that when the pressure is kept at 2–4 atm., the reaction temperature is in the neighborhood of 250° C. For example, on heating a portion of (viz. 60 cm. in length) a copper-lined stainless tube of 2 in. in inner diameter by means of the electric furnace in the presence of 10 gr. of alumina and passing therethrough a gas having CO to $H_2$ ratio of 3:1 at a ratio of 200 l./h., the reaction proceeded at 250° C., affording a synthesis gas which contained 5.6% of ethylene at maximum. While, in case of a charging stock of CO:$H_2$=1:2, the content of ethylene amounted to about 3%. Then, with increasing the reaction pressures up to 20–40 atm., a synthesis gas containing up to 4% of ethylene was produced from a feed gas of CO:$H_2$=1:2 at a temperature of 250° C.

Finally, it was found that among the catalysts of alumina gel, silica gel, or their mixtures, a variety of promoters can be added thereto. Such a catalyst to which is added about 3% of copper oxide brings about a maximum ethylene content of up to 7.6%. Further, when the reactions were effected at temperatures of 200° C. and 225° C., the corresponding ethylene contents amounted to 5.4% and 7.4%, respectively.

The following examples will further illustrate specific embodiments of the invention.

Example 1

A copper-lined pressure-resisting tube of 1 m. in length and 2 cm. in inner diameter was prepared. A portion of the tube (80 cm. in length) packed with 10 gr. of the catalyst was heated externally by means of the electric furnace. The catalyst was prepared by immersing alumina gel into a solution of a metal nitrate, drying the gel, and baking it at 500° C. A feed gas of CO:$H_2$=1:2 was fed at a throughput of 200 l./h. through the tube kept at a temperature of 250° C. under pressures of 20–40 atm., affording the following results:

| Composition of catalyst: | Maximum ethylene content in percentage in the synthesis gas |
|---|---|
| Alumina gel | 4.6 (6.4%, when the feed gas was of CO:$H_2$=1:1). |
| Alumina gel+2% chrome oxide | 5.2 |
| Alumina gel+2% thorium oxide | 4.2 |
| Alumina gel+2% potassium dichromate | 4.8 |
| Alumina gel+2% molybdenum oxide | 2.4 |
| Aluminum gel+3% copper oxide | 7.6 |
| Alumina gel+7% copper oxide | 7.6 |
| Alumina gel+3% nickel | 7.2–7.6 |
| Alumina gel+cobalt | 5.6 |
| Silica gel | 5.4 |
| Silica gel+5% alumina | 5.4 |
| Silica gel+3% copper oxide | 6.4 |

Thus, it was found that alumina to which is added copper oxide is most preferable as the catalyst for this purpose and that the activity of alumina is rather reduced by the addition of either thorium oxide or molybdenum oxide.

With the use of alumina gel+3% copper oxide as the catalyst, the composition in percentage of the synthesis gas was as follows:

|  | Feed gas | Synthesis gas |
|---|---|---|
| $CO_2$ | 0.4 | 0.2 |
| $C_2H_4$ | 0.6 | 7.6 |
| $O_2$ | 0 |  |
| CO | 34.4 | 27.8 |
| $H_2$ | 64.4 | 59.6 |
| $CH_4$ |  | 1.0 |
| $N_2$ |  | 3.8 |

The conversion ratio of carbon monoxide into ethylene and methane is 15.2:1. In other words, it is estimated that about 94% of carbon monoxide is converted into ethylene and the remaining 6% into methane. The variation in quantity from 3 to 7% of copper oxide added to alumina gel has not any substantial effect on the activity. From the industrial point of view, it is still considered that 3% of copper oxides economically advantageous.

Example II

Salts of copper and nickel were tested under the same conditions as in the Example I.
The following results were obtained.

Catalyst: Maximum ethylene content in percentage in the synthesis gas
Alumina gel+3% nickel sulfate _____ 5.0
Alumina gel+3% copper sulfate _____ 6.6
Alumina gel+3% nickel chloride _____ 6.5

Thus, salts of copper and nickel also showed appreciable activity. Particularly, copper sulfate was favorable. This fact indicates that there is little fear of poisoning by sulfur contained in the gas. In this example 95% of carbon monoxide reacted was converted into ethylene.

As has been mentioned above, it is now possible to synthesize ethylene in high yield of more than 90%, using such a catalyst as above which has a remarkable resistance against sulfur present in the gas. It is, therefore, concluded from the industrial standpoint that the process according to this invention is extremely advantageous for the synthesis of ethylene. It has been known in the industry that the production of CO—$H_2$ containing gas can be formed with ease by means of the gasification of coal, heavy oil, or the other carbonaceous materials. The gasification of coal or heavy oil requires less fuel as compared with the process for producing ethylene by the thermal cracking of petroleum. Therefore, it is believed that this invention provides an advantageous process for producing ethylene.

We claim:
1. A process for catalytically synthesizing ethylene which consists of contacting a mixture consisting essentially of carbon monoxide and hydrogen at a temperature from 200° to 450° C. and at a pressure from about 1 to about 40 atmospheres with a catalyst which consists essentially of a member selected from the group consisting of alumina gel, silica gel and mixtures of alumina gel and silica gel.

2. In a process for synthesizing ethylene catalytically, the improvement which consists essentially of contacting at a temperature of about 250° C. and a pressure from about 1 to about 40 atmospheres a mixture consisting essentially of carbon monoxide and hydrogen with a catalyst which consists of (a) a member selected from the group consisting of alumina gel, silica gel and mixtures of alumina gel and silica gel, and (b) a member selected from the group consisting of a compound of a member selected from the group consisting of chromium, copper, nickel and cobalt, whereby ethylene yields of about 90% are obtained.

3. A process for synthesizing ethylene catalytically which consists essentially of contacting a mixture consisting essentially of carbon monoxide and hydrogen at a temperature of about 250° C. and at a pressure from about 1 to about 40 atmospheres with a catalyst which consists of a member selected from the group consisting of alumina gel, silica gel and mixtures of alumina gel and silica gel.

References Cited in the file of this patent
UNITED STATES PATENTS

| 1,911,746 | Burke et al. | May 30, 1933 |
| 2,276,921 | Brown | Mar. 17, 1942 |
| 2,471,228 | Mathy | May 24, 1949 |
| 2,637,739 | McGrath | May 5, 1953 |
| 2,662,090 | Scharmann | Dec. 8, 1953 |
| 2,685,596 | Buchmann | Aug. 3, 1954 |
| 2,735,862 | Buchmann et al. | Feb. 21, 1956 |
| 2,768,961 | Weck et al. | Oct. 30, 1956 |
| 2,791,583 | Weck | May 7, 1957 |